United States Patent

Robinson et al.

[15] 3,650,117

[45] Mar. 21, 1972

[54] PARAELECTRIC REFRIGERATOR

[72] Inventors: Max C. Robinson; Michael R. Wertheimer, both of Montreal, Quebec, Canada

[73] Assignee: Canadian Liquid Air Ltd. Air Liquide Canada Ltee, West Montreal, Quebec, Canada

[22] Filed: June 8, 1970

[21] Appl. No.: 44,432

[52] U.S. Cl. ....................62/3, 165/1

[51] Int. Cl. ....................F25b 21/02

[58] Field of Search ....................62/3

[56] References Cited

UNITED STATES PATENTS 3,436,924 4/1969 Lawless ....................62/3

2,913,881 11/1959 Garvin ....................62/3

*Primary Examiner*—William J. Wye

*Attorney*—Alan Swabey

[57] ABSTRACT

A multistage paraelectric refrigerator comprising a plurality of paraelectric refrigeration stages arranged in series between a heat sink and the material to be cooled, each of these stages being connected to or isolated from adjacent stages and the heat sink or material to be cooled by selectively controlled heat switches, the stages themselves being selectively operated.

A method of cooling with a paraelectric refrigerator wherein a plurality of paraelectric refrigeration stages are arranged in a series and are sequentially operated to transfer heat in a quasi-continuous manner from the material to be cooled to a heat sink.

12 Claims, 3 Drawing Figures

INVENTORS
Max C. ROBINSON
Michael R. WERTHEIMER

Alan Swabey
ATTORNEY

INVENTORS
Max C. ROBINSON
Michael R. WERTHEIMER

Alan Swabey
ATTORNEY

PARAELECTRIC REFRIGERATOR

BACKGROUND OF INVENTION

1. Field of the Invention

This invention relates to refrigerators based on adiabatic depolarization, and in particular to a quasi-continuously operating multistage depolarization refrigerator.

2. Description of Prior Art

Generally, the process of cooling by adiabatic depolarization (de-electrification) involves the following steps. First a capacitor with a paraelectric solid (dielectric doped with dipolar impurities) is thermally connected through a thermal switch to a low-temperature heat sink such as a helium bath. The capacitor is charged until the electric field is sufficiently intense to align the electric dipoles. The heat evolved during the charging escapes through the thermal switch to the bath. The capacitor is then thermally isolated by opening the switch and discharged adiabatically. As a result, the dipoles reassume random orientation and, in so doing, withdraw entropy from the lattice, which produces a lowering in its temperature.

The principle of refrigeration by adiabatic depolarization applies to the range of cryogenic temperatures possibly up to 100° K., depending upon the choice of paraelectric solid; it is, however, most useful in the range of temperatures below about 1° K. since these low temperatures are difficult to achieve by other means: methods for cooling below 1° K., and their lower limiting temperatures are shown in Table I.

TABLE I

| Type of cooling | Approximate lower limit (°K) |
|---|---|
| 1 Vortex refrigeration | 0.7 |
| 2 $He^3$ | 0.3 |
| 3 $He^3$-$He^4$ dilution | 0.020 |
| 4 Adiabatic demagnetization | 0.003 |
| 5 Nuclear demagnetization | 0.00085 |
| 6 Pomeranchuk effect | 0.002 |

These techniques, especially 3 to 6 require very costly equipment and operating skills ranging from considerable to extreme, or they present other disadvantages of a technical nature.

Some relatively low temperatures are easily accessible, for example, by reducing the pressure on a bath of liquid helium. Cryogenic temperatures can also be obtained by using fairly common refrigerants such as liquid nitrogen, neon, hydrogen, etc. in other ranges of the temperature scale. Other temperatures, however, are not as accessible but may be obtained using a suitable paraelectric material in a refrigerator of the type contemplated by the present invention.

Paraelectric refrigerators are known as illustrated, for example, in U.S. Pat. No. 3,436,924 issued to Lawless on Apr. 8, 1969. However, such devices are relatively limited in their application.

SUMMARY OF INVENTION

Broadly, the present invention relates to a multistage refrigerator, each stage being formed by a capacitor having a paraelectric dielectric material, said stages being controllably interconnected by heat switches which may controllably be rendered operative or inoperative. Each of said capacitors are individually controllable over the whole range from an "on" to an "off" position wherein the paraelectric material is polarized or depolarized. The invention also relates to a method of operating the interconnecting thermal switches in relation to the individual stages to reject heat from the system.

BRIEF DESCRIPTION OF DRAWINGS

Further features, objects and advantages of the present invention will be evident from the following detailed description of a preferred embodiment of the present invention taken in conjunction with the accompanying drawings in which.

DESCRIPTION OF PREFERRED EMBODIMENTS

Figure 1:
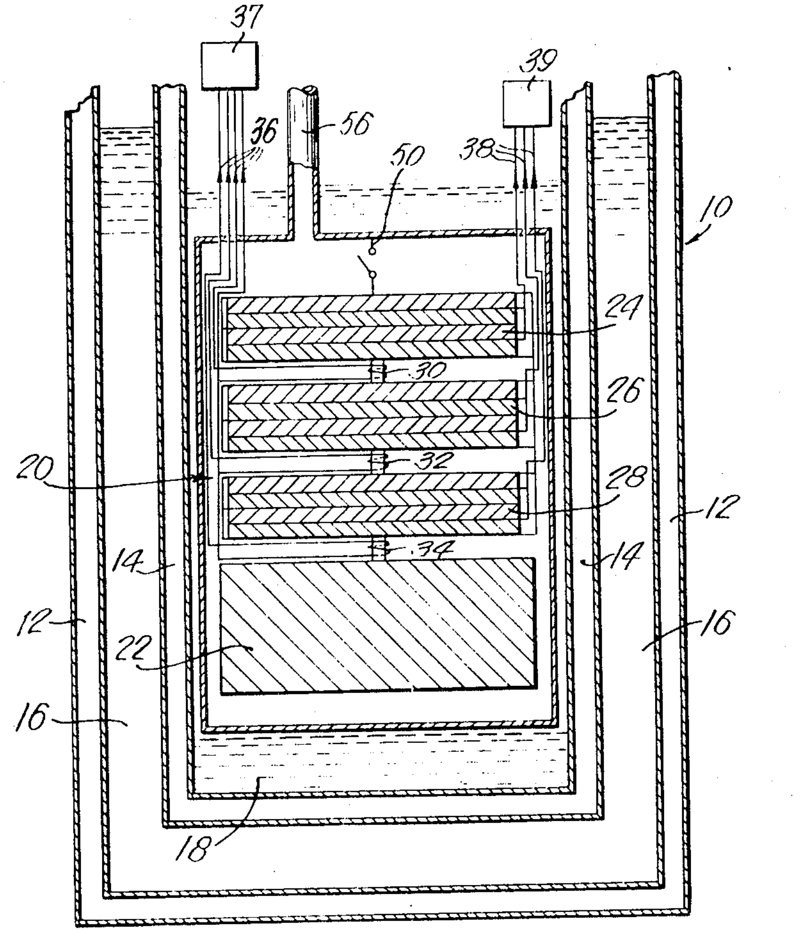
FIG. 1 is a schematic partial elevation view partly in section showing one form of a multistage adiabatic depolarization refrigerator constructed in accordance with the present invention.

A typical cryostat 10 illustrated in FIG. 1 comprises inner and outer dewars 14 and 12 respectively. The space 16 between the inner and outer dewars 14 and 12 may be filled with a suitable cooling agent which in the illustrated arrangement has been designated as liquid nitrogen (while the dewars 14 and 12 have been shown only in part, it will be understood that the inner chamber 18 is completely enclosed in the cryostat.)

A third chamber or calorimeter 20 is positioned in the space 18 defined by the inner dewar 14 of the cryostat 10. This calorimeter 20 contains the working space or material to be cooled 22 together with the various refrigeration stages indicated as 24, 26 and 28, respectively. A vacuum is maintained in the calorimeter 20 to thermally insulate the material 22 and stages 24, 26 and 28 from the calorimeter walls.

The space 18 surrounding the calorimeter 20 contains a suitable cooling agent which in the illustrated arrangement is liquid helium.

Figure 2:
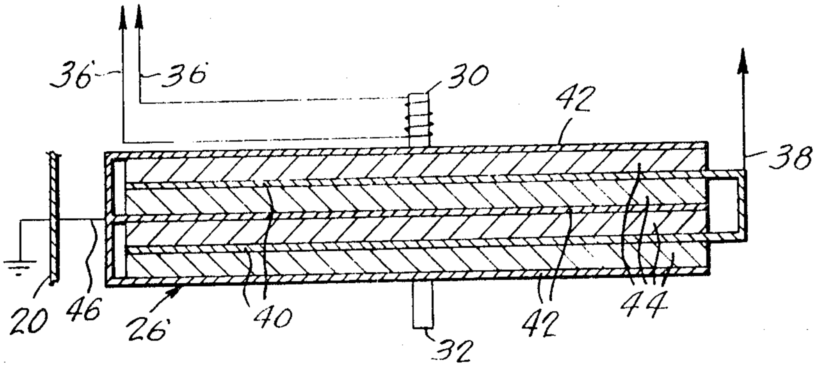
FIG. 2 is an enlarged view illustrating one stage of the refrigerator.

FIG. 2 illustrates one of the stages, it being understood that the other stages may be constructed in essentially the same way. As shown, each stage comprises a plurality of high-voltage electrodes 40 positioned between grounded electrodes 42 and spaced from one another by suitable doped dielectric material 44. Each high voltage electrode is connected through connectors generally indicated at 38 (see FIG. 1) to a control means 39 which supplies the high voltage and which selectively actuates the refrigeration stage. The grounded electrodes 42 preferably will be connected to the calorimeter wall, i.e., to the chamber 20 using wire 46 having high thermal resistance to limit the amount of heat transfer.

The electrodes may be of thin metal foil, for example, gold or the like and the dielectric material may be any suitable paraelectric material as will be discussed in more detail hereinbelow.

In designing a single stage as shown in FIG. 2 and as briefly described hereinabove, the following four main factors must be taken into account.

i. the problem of insulating high voltages
ii. thermal resistance across the dielectric-electrode surface
iii. the relatively high low-temperature specific heat of metals
iv. the practicality of handling thin slabs of dielectrics and very thin metallic foils.

With the above factors in mind, the thickness of the dielectric slab should not exceed about 2 mm. and the number of slabs or electrodes should be as large as possible.

Each of the dielectric slabs is preferably formed by coating with a thin metallic film that should be maintained as thin as possible, while universally covering the surface. Normally this would result in a thickness of the order of 1,000 Angstroms. The coating metal should have a high thermal conductivity, adhere well to the surface of the dielectric material and be chemically inert. Gold has a suitable combination of these properties.

The electrodes 40 and 42 interspaced between the dielectric slabs 44 should be formed by a metal foil made as thin as possible. If the foil is too thin, it becomes a poor heat conductor and too fragile. The foil material should have a high thermal conductivity, be chemically inert and also be ductile. Again, gold has a satisfactory combination of these properties.

To increase the thermal conductance across the dielectric-electrode surface, the foil should cover substantially the entire face of each dielectric slab with which it is in contact. The whole "sandwich" of slabs and foils should be pressed together to decrease the thermal resistance across the dielectric-electrode surfaces. The amount of pressure applied should bring the material of the foils into intimate contact with the coating on the dielectric without damaging the materials forming the stage.

As indicated, each of the thermal switches, in FIG. 2 the thermal switches 30 and 32, are in direct contact with one of the electrodes, preferably with grounded electrodes 42. In this manner, heat travels from the dielectric via the electrodes to the thermal switches, thereby facilitating the flow of heat through each stage. It is important that all of the electrodes connected to the thermal switches be interconnected by suitable means that will facilitate the transfer of heat between the electrode elements.

While the number of plates 40 and 42 have been shown at two and three respectively, it will be apparent that any suitable number of plates may be used.

Each of the working stages 24, 26 and 28 is interconnected with an adjacent stage and the material to be cooled by thermal switches 30, 32 and 34 which may be selectively opened and closed. In the illustrated arrangement, these switches have been shown as superconducting thermal switches well known to those skilled in the art, controllable through electrical current applied through leads 36.

The lead lines 36 lead to a control means and current supply 37 and the lead lines 38 lead to a control means and high-voltage power supply 39. These control means 37 and 39 are adapted to operate the thermal switches and stages respectively in sequence, preferably automatically. The sequences of operation will be described in more detail hereinbelow.

The paraelectric material for each stage 24, 26 or 28 preferably will be different in that it will have a different temperature limitation provided by the dielectric material and the dipolar impurities selected as well as the concentration of dipolar impurities. Preferably, each succeeding stage is designed to operate in a lower but overlapping temperature range relative to its immediately preceding stage. This arrangement permits the maximum cooling power and also the attainment of the lowest ultimate temperature in the final stage.

Some suitable paraelectric materials that may be used include, for example, sodium chloride or potassium chloride (NaCl or KCl) doped with OH ions. The sodium and potassium chloride crystals are preferred for use with the first stage or refrigeration stage 24.

In other stages, it is preferred to use other materials such as RbCl doped with impurities such as CN which permit lower final temperatures.

In any event, the material used as a dielectric in any of the refrigeration stages will be some form of paraelectric insulating material. Based on experimental or theoretical considerations, it is well known that some of the following materials should be usable as dielectric materials and it is believed that the others will be satisfactory.

1. The alkali (Li, Na, K, Rb, Cs) halides (F, Cl, Br, I)
2. The silver or thallous halides
3. Alkaline earth chalcogenides
4. Zeolites
5. Clathrates
6. Noble gas elements
7. Other dielectric materials.

On the basis of experimental or theoretical evidence, it is also believed that any of the above materials may be doped with one or more of the following dipolar materials (subject to accommodation by the lattice): OH, CN, NO, HD, $NO_2$, OCS, alcohols, $CCl_3Br$, etc.

Typical concentrations of dipolar impurities may range from about $10^{16}$ to $10^{20}$ per cubic centimeter.

It is believed that the following theoretical considerations should be followed when selecting a particular host-dipolar combination.

The theoretical minimum temperature attainable by adiabatic depolarization is determined by two factors: phase transitions and quantum effects. When a phase transition occurs, the dipoles remain, upon removal of the applied electric field, in a state of parallel or antiparallel alignment, depending upon whether the crystal is ferroelectric or antiferroelectric. As a result, no change in entropy takes place and hence no cooling. There is no reliable theory that permits calculation of a critical temperature for ferroelectric or antiferroelectric ordering. However, to the extent that a critical temperature, $T_c$ has been calculated it appears that $$T_c \approx Np^2/k \qquad (1)$$

where $p$ is the real, not the effective, dipole moment, $N$ is the number of dipolar impurities per cc., and $k$ is Boltzmann's constant. For $N=10^{18}$ $CN^-$ per cc., and $P_{CN}=2.3\times10^{-19}$ e.s.u.

$$T_c \approx 0.0012 \text{ K.}$$

$T_c$ can be reduced indefinitely by either making the concentration $N$ smaller or by choosing an impurity with a smaller value of $p$.

While in the former case the cooling power of the crystal is reduced, it remains constant in the latter. This can be seen from the following:

It can be shown that for temperatures sufficiently higher than $T_c$ and for moderately large electric fields $$S-S_o(T)=-Np^2/3kT^2\,E^2 \qquad (2)$$

where $E$ is the applied electric field, and $S_o(T)$ is the entropy of the dipoles at temperature $T$ and for $E$=0. If the electric field is reduced at a constant temperature $T_1$ from $E_o$ to $E=O$, then $$\Delta S=-Np^2/3kT_1^2\,E_o^2 \qquad (3)$$

The field value at which all the dipoles are aligned is $$E_o \approx 2kT_1/p \qquad (4)$$

so that $$T_1\Delta S=-(4N/3KT_1 \qquad (5)$$

(A more exact analysis would yield a very similar result). Hence, if $N$ is kept constant and the initial field is always equal to the maximum effective value $E_o$, then the cooling power is proportional to the initial temperature $T_1$. However, at temperatures that are not too close to those of a phase change, the specific heat of the crystal and environment vary as $a_1\,T+a_2T^3$. If the amount of metallic material is kept small, the refrigerator is more effective at lower than at higher temperatures.

The second limitation to the lowest temperature achievable by paraelectric cooling is imposed by quantum mechanics. For the $T^{-1}$—like behavior of the dielectric constant, it is necessary that the difference between the energy levels—the so-called zero-field splitting—be less than $kT$. The magnitude of this splitting can be shown to vary inversely as some power $n$ ($n>1$) of the dipolar impurity's moment of inertia. Thus, in order to achieve extremely low temperatures, large and heavy dipolar impurities must be used. Examples of such impurities are OCS, alcohols, $CCl_3Br$, etc. Host lattices capable of accommodating such large dipolar impurities are clathrates and zeolites. The presently known low temperature limit of less than 0.1 K. is for $3\times10^{18}$ $CN^-$ in RbCl; the zero-field splitting of this system is about 0.1 K.

The cooling power which can be achieved with paraelectric cooling is given by Expression (3). Substituting typical numbers for the various quantities, and taking $T_1$=1.3 K., the thermal energy extracted from the system is $$T_1\Delta S=5{,}400 \text{ ergs/cm.}^3\approx^{-4} \text{ cal./cm.}^3$$

This is quite small compared with the cooling power of a paramagnetic slat used in adiabatic demagnetization cooling. The overall cooling power can, however, be made equal by employing large volumes of paraelectric working material and a quasi-continuous mode of operation, which are not practical in the case of magnetic cooling.

For simplicity, the above explanation has been referred to a heat sink at $T_1$=1.3 K. which is achieved by pumping on a liquid helium bath. At these temperatures superconducting thermal switches are not particularly effective, and a mechanical device is preferred. For this reason, the refrigerator of FIG. 1 has been provided with a mechanical heat switch schematically illustrated at 50 which may be opened and closed to permit the flow of heat from the first refrigeration stage 24 to the helium bath.

Figure 3:
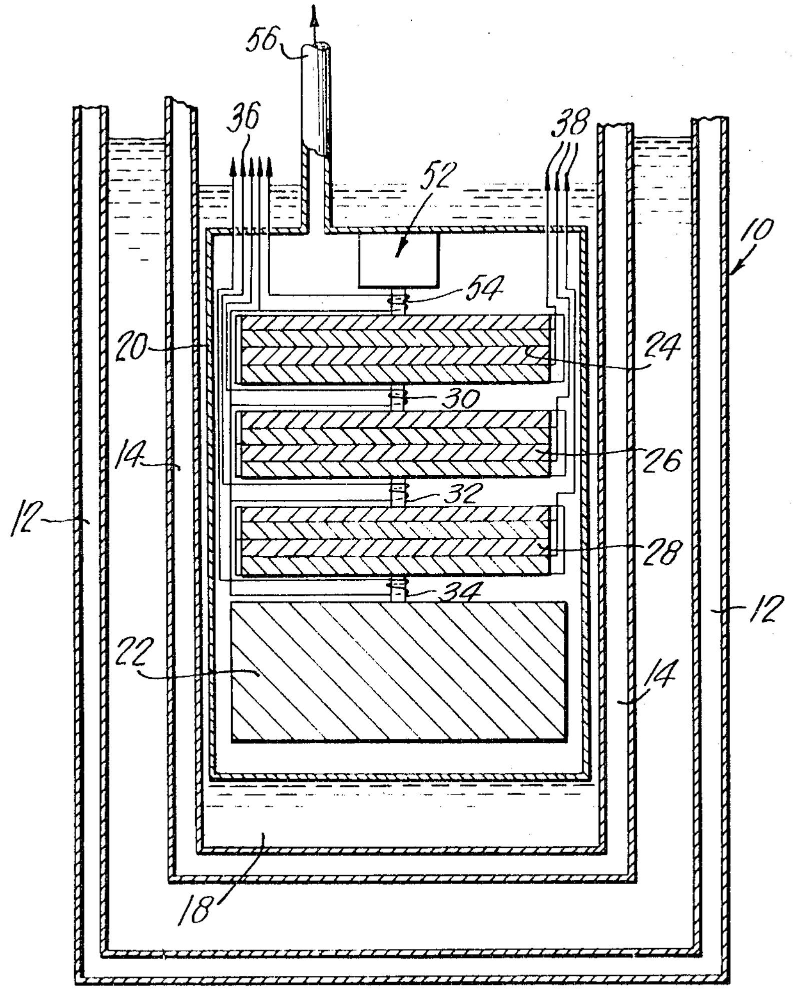
FIG. 3 is a diagram similar to FIG. 1 to which a "vortex refrigeration" stage has been added between the cooling bath and the first stage of the depolarization refrigerator.

An improved design wherein a superconducting heat switch may be used in place of the mechanical switch 50 is shown in FIG. 3. In this arrangement, a "vortex refrigerator" 52, as described, for example, in a paper by Staas and Severijns in "Cryogenics,"Vol. 9, pages 422 to 426, Dec. 1969, is interposed between the helium bath within the chamber 18 and the first stage 24 of the refrigerator and is connected to the stage 24 by the superconducting heat switch at 54. Vortex refrigerators are capable of furnishing several milliwatts of cooling power at temperatures as low as 0.7 K.

The paraelectric refrigerating stages as above indicated are enclosed within the calorimeter 20 which is connected to a suitable source of vacuum via tube 56 to maintain the insulating vacuum between the refrigerant and the various cooling stages and working space.

Having generally described the components of the instant invention, the operation of same will now be described in detail.

The entire unit is initially cooled to the temperature of the heat sink which in the illustrated arrangement is in the form of a helium bath surrounding the calorimeter 20. When the overall temperature of the calorimeter 20 and its contents has been reduced to that of the helium bath, an electric field is applied to all stages 24, 26 and 28 and the stages are polarized. All the heat switches, i.e., 30, 32, 34, 50 or 54 are closed to permit heat flow. Then the mechanical switch 50 or the superconducting switch 54 between the bath or vortex refrigerator 52, respectively, and stage 24 is opened, stage 24 then depolarized. The result is that all stages and the material 22 are cooled by the refrigerating power of stage 24. Next, the switch 30 is opened then stage 26 depolarized, thereby further cooling stages 26, 28 and the material 22. Switch 32 is then opened, isolating stage 28 from 26 and then stage 28 depolarized still further cooling stage 28 and the material 22. Finally, switch 34 is opened to isolate stage 28 from the material 22.

The next cycle may proceed as follows.

1. Switch 50 or 54 is closed and stage 24 is polarized.
2. Switch 50 or 54 is opened and switch 30 is closed, stage 24 is depolarized and stage 26 polarized.
3. After thermal equilibrium is reached between stages 24 and 26, switch 30 is opened, switch 32 closed, stage 26 depolarized and stage 28 polarized.
4. After thermal equilibrium is reached between stages 26 and 28, switch 32 is opened and switch 34 is closed and stage 28 is depolarized.
5. After thermal equilibrium is reached between stage 28 and the material to be cooled 22, switch 34 is opened.

The latter cycle can be repeated indefinitely so that there will be a continued flow of heat from the material 22 to the heat sink. Eventually, if heat leaks are sufficiently small, each stage will be cooled to a temperature that depends upon the temperature of the previous stage, but is independent of the presence of the following stage(s). It is understood that variations to this procedure are possible while still retaining the principle of quasi-continuous depolarization cooling. For example, stage 24 may be polarized and depolarized several times in order to cool further stage 26 before stage 26 is depolarized as in step 2 above. Similarly, any other stage could be polarized and depolarized a plurality of times.

Some possible sources of heat leak and steps taken to eliminate them as far as possible are shown in Table II.

TABLE II

| Source of heat leak | Remedies |
|---|---|
| (i) Heat conduction through high voltage and other leads. | Use of high resistance alloys such as Manganin, Nichrome and Evanohm which are very poor thermal conductors.<br>Use of "Thermal Anchors": upon entering into the calorimeter, the temperature of the leads is made equal to that of the heat sink by intimate thermal contact via a material such as quartz or sapphire which is an excellent conductor of heat at low temperatures as well as an excellent electrical insulator. |
| (ii) Mechanical vibrations. | All parts of the refrigerator must be firmly held in place. The cryostat itself is mounted on a vibration-free base. The pumping line is connected by a long piece of thick-walled rubber tubing. |
| (iii) Radiant energy------ | The very low temperature parts within the calorimeter are shielded from the calorimeter wall by metallic screens thermally anchored to the preceeding stage.<br>Electrical leads into the cryostat, which may be exposed to electromagnetic radiation, may be electrically shielded.<br>Radiation traps are installed on all tubing leading to the calorimeter so that there is no line-of-sight path for photons. |

While the invention has been described with reference to three stages, it is apparent that any number of refrigeration stages may be incorporated as desired; however, there will be more than one cooling stage in each arrangement. Also, the invention has been described in relatively simple form. If desired, the operation may be improved by adding thermal ballast between the stages by using a substance such as holmium which has a high specific heat at low temperatures and thereby reduces temperature fluctuations.

Modifications will be apparent to those skilled in the art without departing from the spirit of the invention as defined in the appended claims.

1. A multistage paraelectric refrigerator comprising a plurality of paraelectric refrigeration stages arranged in sequence, thermal switches between adjacent of said stages and material to be cooled, means to actuate each of said stages individually and means to actuate each of said thermal switches individually.

2. A refrigerator as defined in claim 1, wherein each of said stages is formed by a plurality of high-voltage electrodes interposed between a plurality of low-voltage electrodes with a paraelectric material interposed between said electrodes.

3. A multistage paraelectric refrigerator as defined in claim 2, wherein said heat switches are superconducting heat switches.

4. A refrigerator as defined in claim 1, wherein said refrigerator is received within a cryostat and is connected with a low-temperature heat sink by means of a further thermal switch interposed between said heat sink and a first stage of said plurality of stages.

5. A refrigerator as defined in claim 2, wherein said refrigerator is received within a cryostat and is connected with a low-temperature heat sink by means of a further thermal switch interposed between said heat sink and a first stage of said plurality of stages.

6. A refrigerator as defined in claim 3, wherein said refrigerator is received within a cryostat and is connected with a low-temperature heat sink by means of a further thermal switch interposed between said heat sink and a first stage of said plurality of stages.

7. A refrigerator as defined in claim 6, wherein said further switch is a superconducting heat switch and is connected to said heat sink through a "vortex refrigerator."

8. A multistage paraelectric refrigerator as defined in claim 1, wherein some of said stages incorporate a paraelectric material of different paraelectric characteristics to those in other of said stages.

9. A multistage paraelectric refrigerator as defined in claim 8, wherein the paraelectric characteristics of said stages vary in sequence whereby the stage closest to the material to be cooled is capable of reaching the lowest temperature.

10. A multistage paraelectric refrigerator as defined in claim 6, wherein each of said stages varies in paraelectric properties whereby the stage closest to said material to be cooled is capable of reaching the lowest temperature.

11. A method of cooling using an arrangement of a plurality of paraelectric refrigeration stages in series between a material to be cooled and a heat sink with adjacent of said stages, said heat sink and said material being interconnected by thermal switches comprising 1. all of said switches closed, polarizing all of said stages;
2. opening a thermal switch between a first stage and said heat sink and depolarizing said first stage;
3. opening a thermal switch between said first stage and a second stage and depolarizing said second stage;
4. repeating the above-defined sequence until all stages have been depolarized and the last stage has cooled said material.

12. A method as defined in claim 11, further comprising continuing said cooling process by applying a second cycle wherein:

a. closing the switch between said heat sink and said first stage and polarizing said first stage;
b. opening said switch between said first stage and said sink; depolarizing said first stage and polarizing said second stage with the switch between said first and said second stages closed;
c. after equilibrium is established between said first and second stages, opening the switch between the first and second stages and closing the switch between the second stage and the next stage or material in the sequence and depolarizing the second stage;
d. repeating the above-defined sequence of opening and closing the thermal switches and polarizing and depolarizing the stages until all the stages in the sequence have been operated and the last stage has been depolarized with the thermal switch between the last stage and the material closed;
e. opening the thermal switch between the last stage and said material after thermal equilibrium is established between said last stage in said material;
f. repeating the whole second cycle as desired.

* * * * *